United States Patent
Jelley et al.

(10) Patent No.: US 7,055,658 B2
(45) Date of Patent: Jun. 6, 2006

(54) GAIN STABILIZING SELF-ENERGIZED BRAKE MECHANISM

(75) Inventors: Frederick A. Jelley, Suttons Bay, MI (US); Joseph A. Kay, Highland, MI (US); James R. Brichta, Highland, MI (US); Dennis G. O'Reilly, Rochester Hills, MI (US); Christopher S. Keeney, Troy, MI (US); Jaeho Kwak, West Lafayette, IN (US); Dennis A. Kramer, Troy, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 0 days.

(21) Appl. No.: 10/747,746

(22) Filed: Dec. 29, 2003

(65) Prior Publication Data

US 2005/0139435 A1 Jun. 30, 2005

(51) Int. Cl.
*F16D 55/14* (2006.01)
*F16D 55/46* (2006.01)

(52) U.S. Cl. .................. 188/72.2; 188/28; 188/72.9

(58) Field of Classification Search ............... 188/72.2, 188/28, 56, 72.6, 72.9; 74/520, 521; 81/416
See application file for complete search history.

(56) References Cited

U.S. PATENT DOCUMENTS

| | | | | |
|---|---|---|---|---|
| 1,267,133 A | * | 5/1918 | Smith ........................... | 81/416 |
| 2,274,945 A | * | 3/1942 | Van Keuren ................. | 7/134 |
| 2,527,072 A | * | 10/1950 | Pogue ....................... | 188/73.31 |
| 2,590,062 A | * | 3/1952 | Bachman ................... | 188/73.31 |
| 3,003,589 A | * | 10/1961 | Desbrow .................... | 188/72.3 |
| 3,109,517 A | * | 11/1963 | Smith et al. ................ | 188/71.7 |
| 3,207,267 A | * | 9/1965 | Beuchle et al. ............. | 188/72.2 |
| 3,318,420 A | * | 5/1967 | Adams ....................... | 188/72.2 |
| 3,465,849 A | * | 9/1969 | Bernfeld et al. ........... | 188/71.9 |
| 4,066,152 A | * | 1/1978 | Pascal ........................ | 188/171 |
| 4,592,451 A | * | 6/1986 | Persson ..................... | 188/71.9 |
| 4,706,786 A | * | 11/1987 | Nadas .................... | 188/196 BA |
| 4,827,930 A | * | 5/1989 | Kees, Jr. .................... | 606/142 |
| 4,842,102 A | * | 6/1989 | Tateyama et al. ......... | 188/24.21 |
| 4,854,425 A | | 8/1989 | Sevadis | |
| 4,946,007 A | | 8/1990 | Pederson et al. | |
| 4,974,704 A | | 12/1990 | Miller et al. | |
| 5,058,714 A | | 10/1991 | Weiler et al. | |
| 5,390,986 A | | 2/1995 | Hall III | |
| 5,775,782 A | | 7/1998 | Akita et al. | |
| 5,921,354 A | * | 7/1999 | Evans ....................... | 188/73.2 |
| 6,318,513 B1 | | 11/2001 | Dietrich et al. | |

* cited by examiner

*Primary Examiner*—Robert A. Siconolfi
(74) *Attorney, Agent, or Firm*—Carlson, Gaskey & Olds

(57) ABSTRACT

A self-energized disk brake assembly includes gain stabilization features for controlling the multiplication of applied force against a rotatable brake member. The brake assembly includes a first brake pad supported about a first pivot and a second brake pad supported about a second pivot. An actuator applies a force to drive the brake pads into the rotatable brake member. Frictional force between the brake pads and the rotatable brake member pulls the brake pads into further engagement generating an increase in braking force from self-energization. A position of the first and second pivots is adjustable to control the amount of braking force generated from self-energization.

8 Claims, 7 Drawing Sheets

GAIN STABILIZING SELF-ENERGIZED BRAKE MECHANISM

BACKGROUND OF THE INVENTION

This invention generally relates to a disk brake assembly and specifically to a self-energized disk brake assembly including features for stabilizing braking force gain.

Conventional disk brake assemblies require a considerable amount of mechanical force to obtain the required braking force. The mechanical force is typically provided by a hydraulic piston actuated to force brake pads against a rotor. The piston is typically movable within a caliper housing. The caliper housing is either of a fixed or floating configuration. A fixed caliper housing remains fixed relative to the rotor as the brake pads move into contact with the rotor. A fixed caliper includes two pistons for moving the brake pads into engagement with the rotor. A floating caliper uses a single piston that moves one of the brake pads into contact with the rotor, and floats to pull the second pad into contact on an opposite side of the rotor.

A Self-energizing brake creates additional braking forces above any applied force to increase braking forces on the rotating brake member. Self-energizing brakes are known in the art, and have several problems that have so far prevented wide spread use in motor vehicles. The multiplication of braking force is generated by a specific configuration of brake pad or shoe and a frictional force caused during engagement with the rotating brake member. An applied force causes engagement between the rotating brake member and the brake pad. Rotation of the rotating brake member pulls the brake pad or shoe into the rotor, multiplying the overall braking force.

Disadvantageously, inconsistencies in frictional force and applied force between different wheels of a vehicle result in disproportionate amounts of braking force applied to each wheel. Non-uniform braking pressure on each wheel can result in undesirable vehicle handling. Further, the amount of applied force is not linearly proportional to the increase in braking force caused by self-energization. The result of such a non-linear relationship is large variations in braking force increases that are not controllable or consistent.

Accordingly, it is desirable to develop and design a self-energizing brake assembly having a stable, uniform and predictable gain in braking force.

SUMMARY OF THE INVENTION

The present invention is a self-energized brake assembly having gain stabilization features for controlling the multiplication of applied force to a rotatable brake member.

A brake assembly designed according to this invention includes a first arm pivotally attached to a first pivot and a second arm pivotally attached to a second pivot. Each of the first and second arms includes friction material forming a contact surface for engagement with a rotatable brake member. The first and second pivots are movably mounted to an adjustable member. The first pivot of the first arm is disposed on an opposite side of the contact surface with the rotatable brake member. The second pivot of the second arm is also disposed on an opposite side of the contact surface of the rotatable brake member. The distance between the first and second pivots and the contact surface along with applied pressure on the first and second arms causes rotation of the first and second arms into the rotatable brake member to multiply braking force exerted on the rotatable member. An actuator or other passive means such as a compliant member adjusts the distance between the first and second pivots to control the gain or increase in braking force caused by self-energization. Control of the gain in braking force prevents instability caused by uncontrolled increases in braking forces.

Another brake assembly according to this invention includes first and second brake pads attached at a first segment by a hinged connection. A second segment of the first and second brake pads are selectively engaged with the rotatable brake member by a threaded rod rotated by an actuator. Contact between the first and second brake pads and the rotating brake member causes the first end to rotate away from the rotating brake member. The hinged connection constrains this rotation resulting in a multiplication in braking force caused by the first and second brake pads being pulled into the rotating brake member. The actuator rotates the threaded rod in a reverse direction to disengage the first and second brake pads from the rotating member. Control of the pressure applied to each brake pad controls the magnitude of self-energization, which results in a stable increase in braking force.

Another brake assembly according to this invention includes first and second brake pads pivotally attached by two equal length pivot arms to a support. Friction between the first and second brake pads pulls the brake pads into the rotating member to provide the desired self-energization. The angle of the pivot arm relative to the rotating member provides a desired increase in braking force caused by a compliant link or a specific location of a brake pad pivot relative to the rotating member.

Another brake assembly of this invention includes a pivot link attachment between the brake pads. One of the brake pads is fixed to the caliper housing such that engagement of one brake pad pulls the other brake pad into engagement with the rotating brake member. A lever or actuator rotates one of the brake pads into engagement with the rotating member. Rotation of one brake pad is translated by way of the pivot link into rotation of the second brake pad. Rotation of the brake pads into the rotating member results in the brake pads being pulled into the rotating member and increased braking force.

Accordingly, the present invention provides a stable, self-energizing brake assembly with uniform, controllable and predictable increases in braking force.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
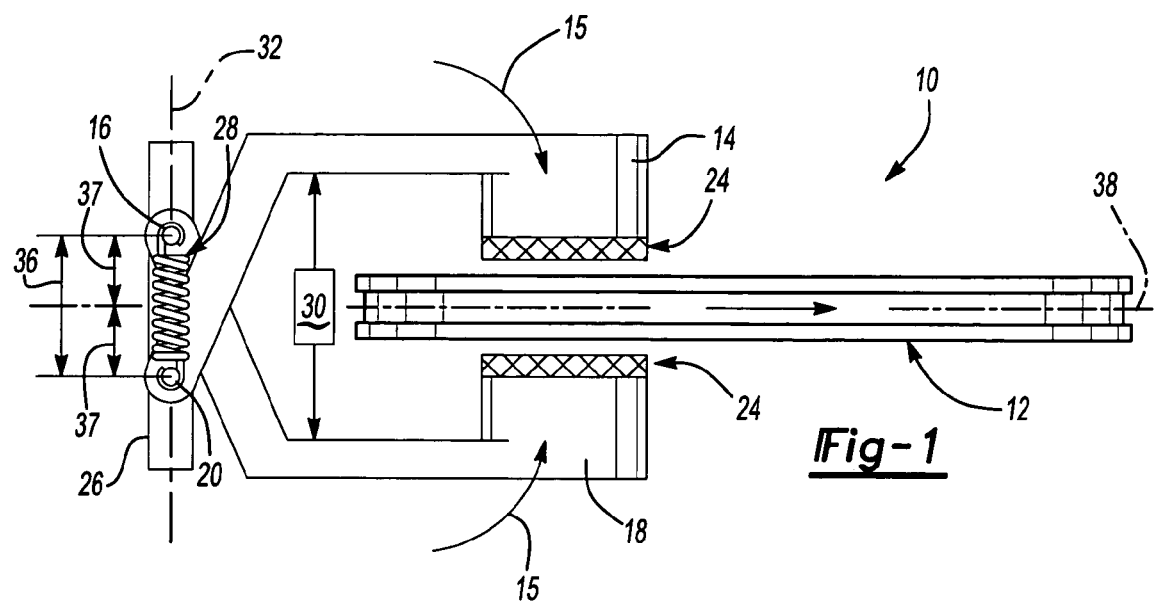
FIG. 1 is a schematic view of a self-energized brake assembly.
Figure 2:
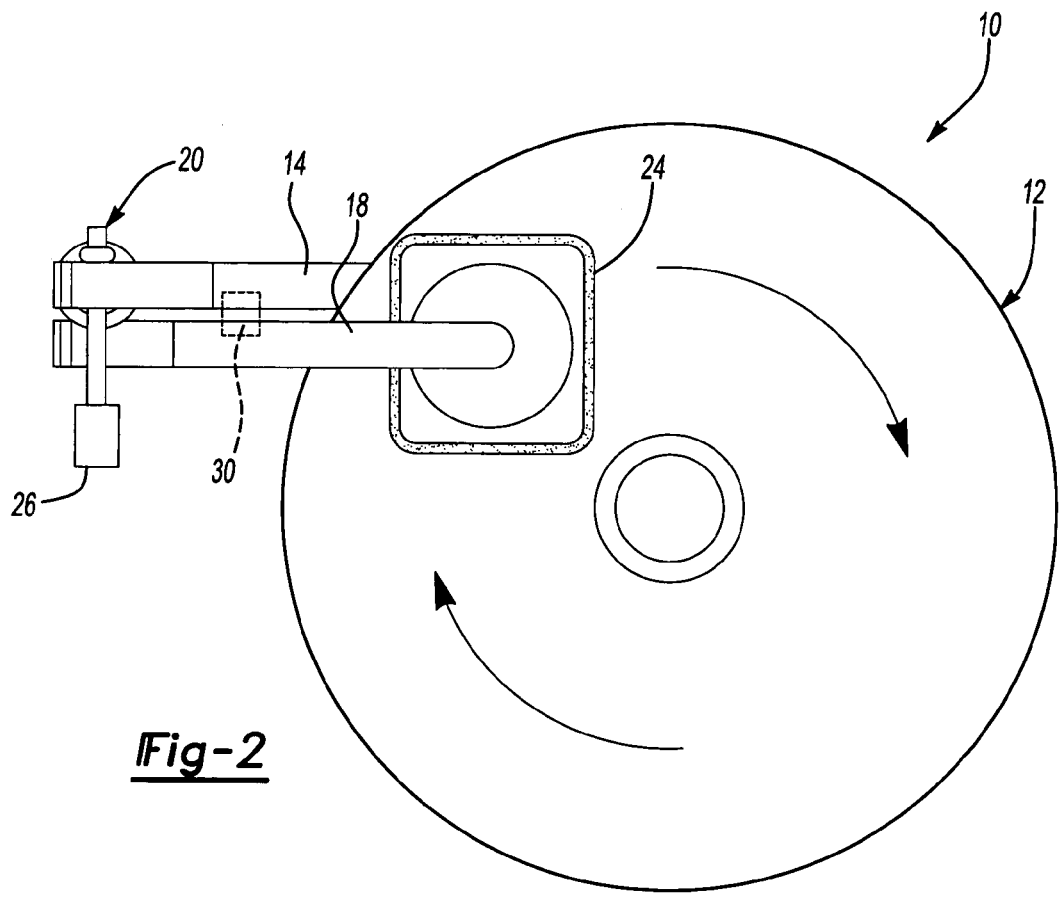
FIG. 2 is another schematic view of the self-energized brake assembly shown in FIG. 1.

Referring to FIGS. 1 and 2, a self-energizing brake assembly 10 includes first and second calipers 14, 18 pivotally attached to a support 26. The calipers 14, 18 engage a rotor 12. The contact surface between the calipers 14, 18 and the rotor 12 is formed by friction material 24. Frictional contact between the calipers 14, 18 causes a rotation toward the rotor 12 in a direction indicated by arrows 15 that magnifies braking force applied to the rotor 12.

A first pivot 20 supports the first caliper 14 and a second pivot 16 supports the second caliper 18. A distance 36 between each of the pivots 16, 20 is adjustable. An actuator 30 is used to adjust the distance 36 between the pivots 16, 20. Friction between the calipers 14, 18 and the rotor 12 pulls the calipers 14,18 in the direction of rotation of the rotor 12. The offset position of the pivots 16, 20 causes each caliper 14,18 to be pulled in the direction of rotation of the rotor 12. The pivots 16, 20 are located on an opposite side of the contact surface that the corresponding caliper 14, 18 engages. Frictional force between the rotor 12 and the calipers 14, 18 causes an increase in the magnitude of force gain exerted to stop rotation of the rotor 12.

The pivots 16, 20 are movable linearly relative to each other within a common plane 32. The first pivot 20 is disposed on an opposite side of centerline 38 relative to the first caliper 14. The position opposite the centerline 38 creates the rotation moment 15 that pulls the caliper 14 into the rotor 12. The second pivot 16 is on an opposite side of the centerline 38 relative to the second caliper 18, causing the second caliper 18 to be pulled into the rotor 12. Although preferably, the pivots 16, 20 are on an opposite side of the centerline 38, the pivots 16, 20 need only be on an opposite side of the contact surface between the rotor and the corresponding caliper 14, 18.

A distance 37 between the centerline 38 and each of the pivots 16, 20 is uniform creating a uniform balanced force between the calipers 14, 18 as each is pulled into the rotor 12. The pivots 16,20 are biased toward each other by a spring 28. Although a spring is described, other biasing devices as are known to a worker skilled in the art, are within the contemplation of this invention.

The pivots 16, 20 move along the support 26 within the common plane 32 in response to movement of the actuator 30. The force gain realized is a factor of the friction force between the rotor 12 and each caliper 14, 18 and the position of the pivots 16, 20. The friction force is dependent on material properties of the friction material 24 and the rotor 12, the force exerted to engage the rotor 12 with the calipers 14, 18, and the position of the pivots 16, 20. The distance 36 between the pivots 16, 20 is adjusted to control the force gain. As the distance 36 increases, the gain in force from self-energization increases, because the rotational moment is magnified. Decreasing the distance 36 decreases the magnitude of force gain from self-energization. The actuator 30 adjusts the distance 36 between the calipers 14, 18 to control the magnitude of force gain. The distance 36 correlates to a difference between the contact surface of the rotor 12 and each of the pivots 16, 20. The distance between the contact surface and the pivots 16, 20 generate the gains in braking force. Control of the force gain of the self-energized brake assembly 10 prevents lock up conditions and provides for uniform control of braking forces.

Figure 3:
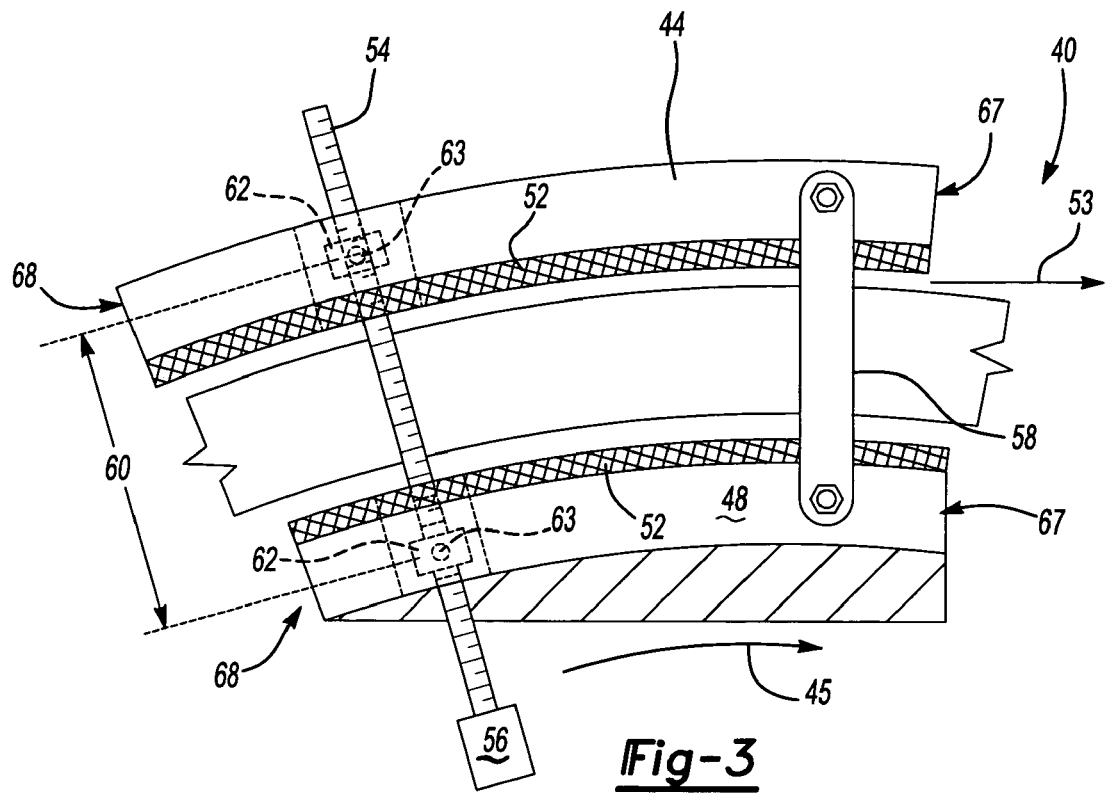
FIG. 3 is a schematic view of another self energized disk brake according to this invention.
Figure 4:
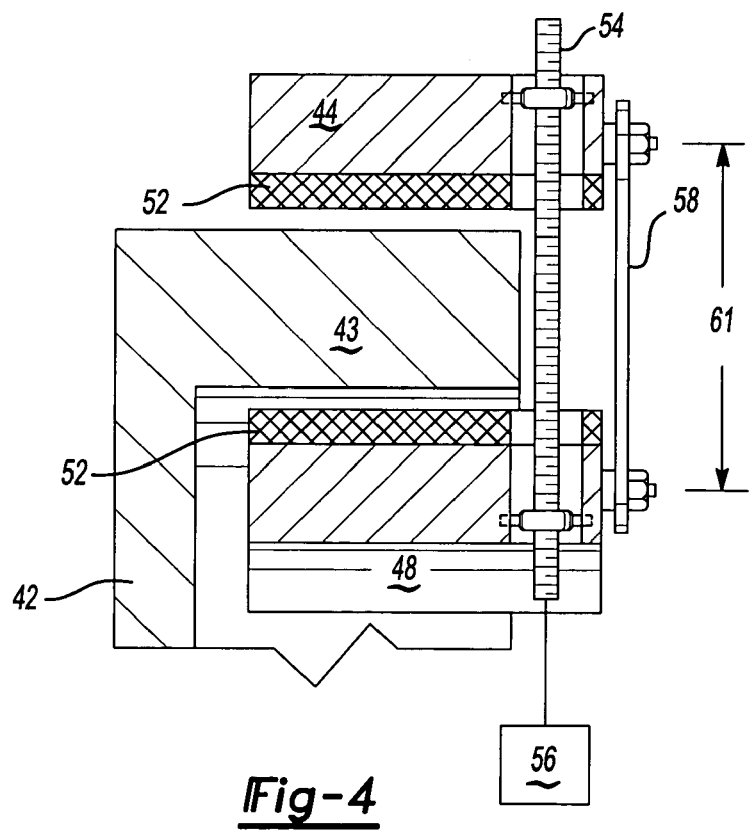
FIG. 4 is a schematic view of the self-energized disk brake assembly shown in FIG. 3.

Referring to FIGS. 3 and 4, another self-energized brake assembly 40 according to this invention includes first and second brake pads 44, 48 pivotally attached to a hinge 58. The first and second brake pads 44, 48 move between an applied position and a released position. The first and second brake pads 44, 48 engage a rotor 42 in the applied position. The rotor 42 includes a flange 43 extending transverse to rotation of the rotor 42. The brake pads 44, 48 are disposed on opposite sides of the flange 43.

An electric motor 56 rotates a threaded rod 54 to move the brake pads 44, 48 between the applied and released positions. The threaded rod 54 is threadingly engaged to internal threads 62 disposed on each of the brake pads 44, 48. The internal threads 68 may either be a separate component, such as a nut, or an integral feature of each brake pad 44, 48. Rotation of the threaded rod 54 changes a distance 60 between the brake pads 44, 48 such that the friction material 52 engages the rotor flange 43 of the rotor 42.

Rotation of the threaded rod 54 by the drive 56 causes movement of the brake pads 44, 48 into initial contact with the flange 43. Once the brake pads 44, 48 have engaged the flange 43 of the rotor 42, a frictional force generated by the interaction between the brake pads 44, 48 and the flange 43 in the direction indicated by arrow 53 pulls the brake pads 44, 48 in the direction of rotation 45 of the rotor 42. The braking force required to control rotation of the rotor 42 is generated by the frictional forces pulling the brake pads 44, 48 into contact with the rotor 42 with increasing force. The motor 54 need not generate all of the braking force required to control rotation of the rotor 42. The electric motor 56 requires only enough power to apply sufficient force between the brake pads 44, 48 and the rotor 42 to initiate brake self-energization.

Each brake pad 44, 48 includes a segment 68. The internal thread 62 is disposed adjacent the segment 68 and allows some rotation about pivot points 63 of the brake pads 44, 48 relative to the threaded rod 54. The hinge 58 is pivotally attached adjacent a segment 67 distal from the segment 68.

Figure 5A:
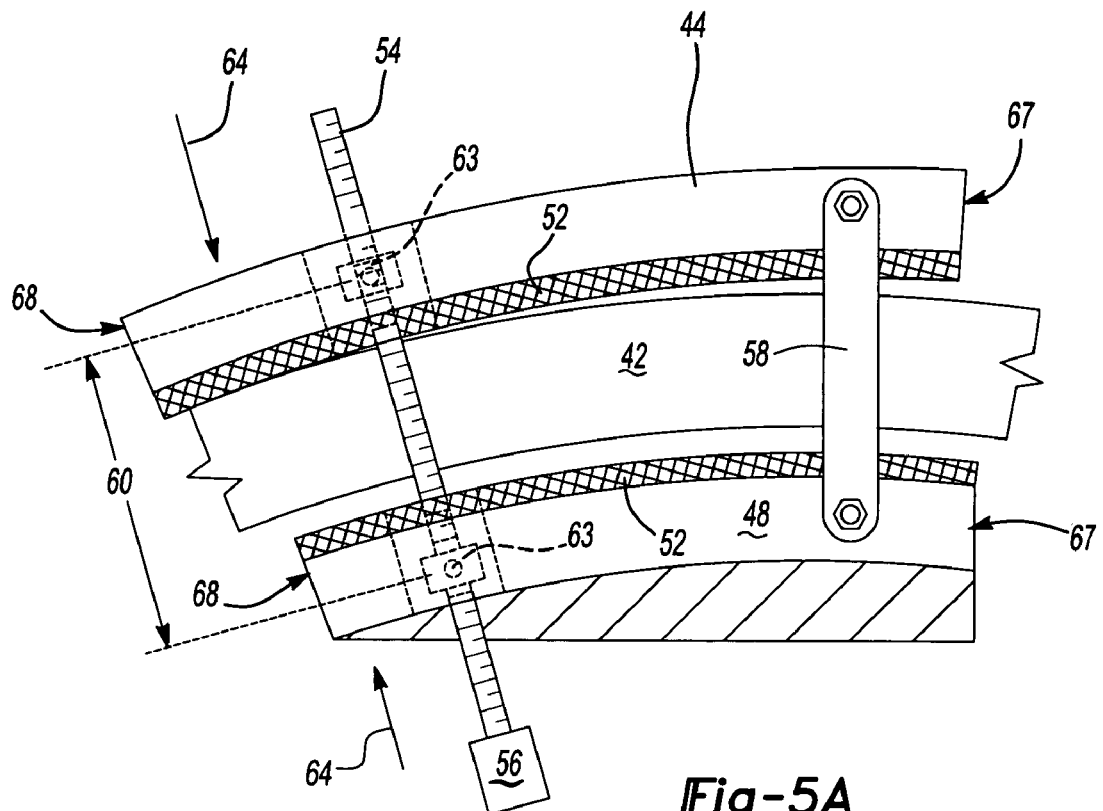
FIG. 5A is a schematic view illustrating initial contact between the brake pads and the rotating member for self-energized disk brake assembly shown in FIGS. 3 and 4.
Figure 5B:
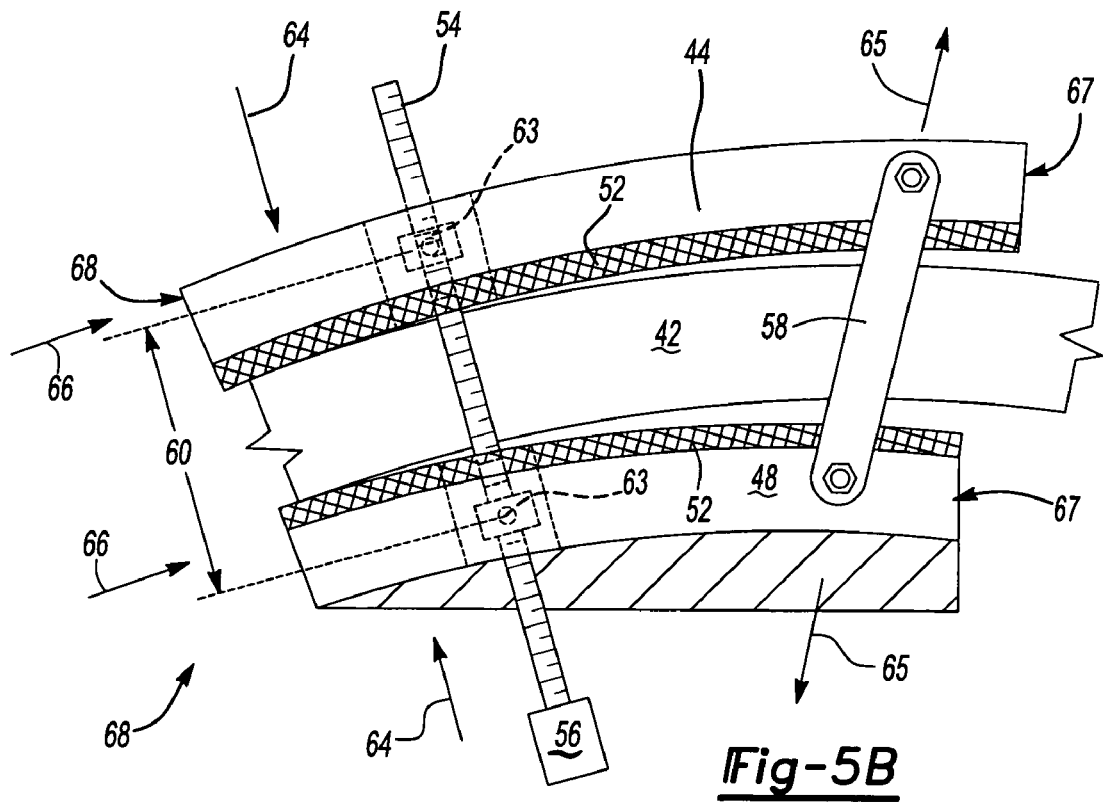
FIG. 5B is a schematic view illustrating self-energization of the disk brake assembly shown in FIGS. 3 and 4.
Figure 5C:
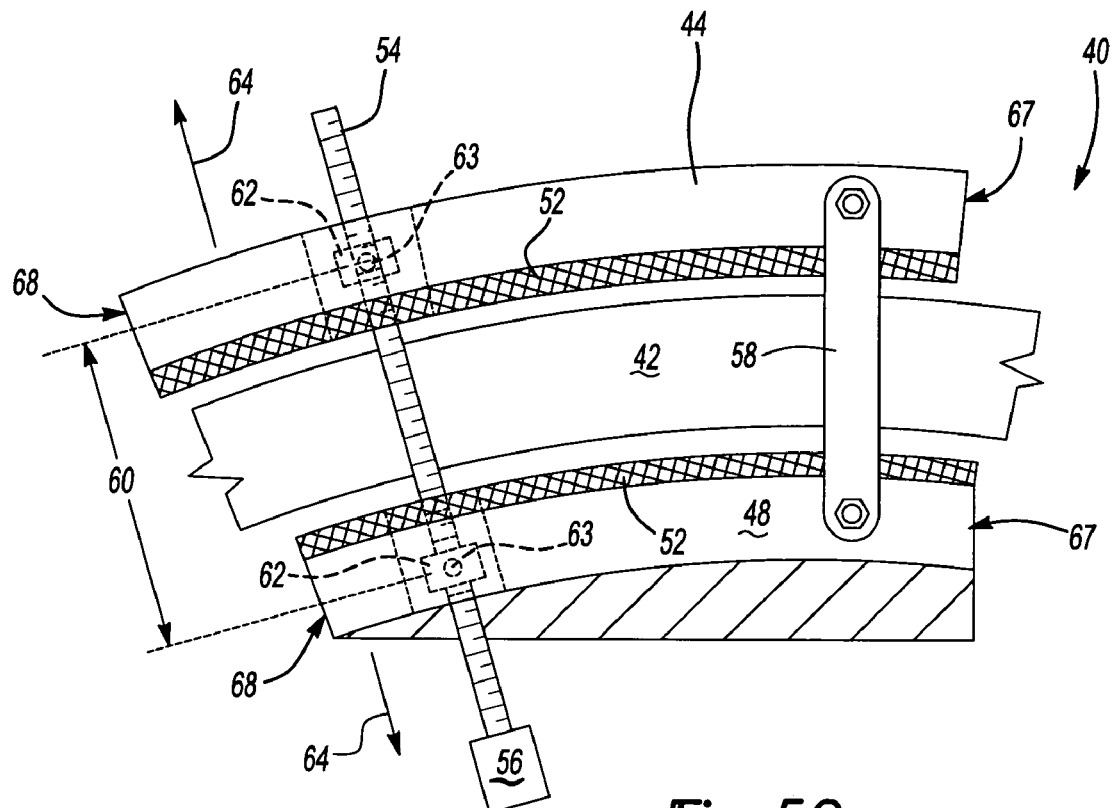
FIG. 5C is a schematic view illustrating release of the brake pads from the rotating brake member for the disk brake assembly shown in FIGS. 3 and 4.

Referring to FIGS. 5A–C, operation of the brake assembly 40 is schematically shown. Rotation of the threaded rod 54 by the actuator 56 moves brake pad segments 68 into contact with the rotor flange 43. The segment 67 of each brake pad 44, 48 pivotally attached to the hinge 58 remains free of contact the rotor 42. Movement of the drive 56 rotates the threaded rod 54 and moves the segments 68 in the direction indicated by arrow 64 toward the rotor 42 (FIG. 5A).

Engagement of the brake pads 44, 48, with the rotor 42 (FIG. 5B) initiates a frictional force that pushes the segment 68 in the direction indicated at 66. The same force pushing the brake pads 44, 48 in the direction 66, rotates the segments 67 away from the rotor 42 as shown by arrows 65. The hinge 58 constrains rotation of segments 67 causing an increase in braking force against the rotor 42 at the segments

68. The magnitude of increase in braking force is controlled by adjusting the distance 60 between the pivot points 63. Adjusting the distance 60 and the length 58 controls the amount of frictional force generated between the brake pads 44, 48 and the rotor 42. Control of the frictional force generated between the brake pads 44, 48 controls the magnitude of force gain caused by engagement of the brake pads 44, 48 with the rotor 42.

Referring to FIG. 5C, disengagement of the brake pads 44, 48 is accomplished by reversing rotation of the threaded rod 54. The brake pads 44, 48 are moved in the direction indicated by arrows 65 away from the rotor 42. Control of the force gain is provided by selecting a distance 60 corresponding to a desired gain in braking force.

Figure 6:
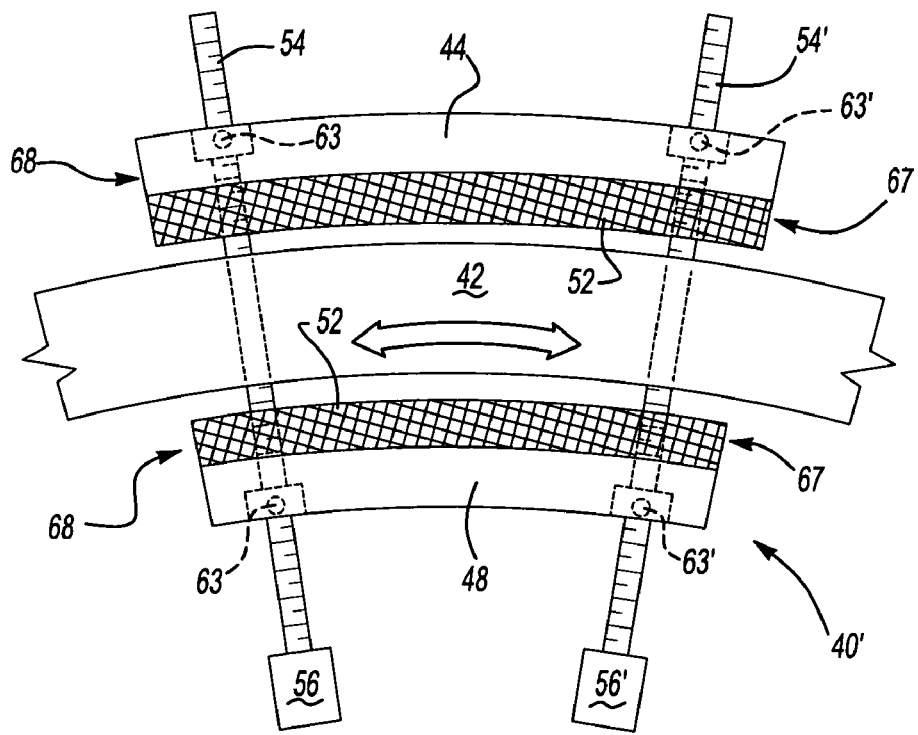
FIG. 6 is a schematic view of another self-energized disk brake assembly.

Referring to FIG. 6, a self-energized brake assembly 40' includes a second electric motor 56' and threaded rod 54'. The second motor 56' and threaded rod 54' provide for movement of the end 67 of each of the brake pads 44,48. Movement of the brake pads 44, 48 from the end 67 accommodates rotation of the rotor 42 in a reverse direction. In operation, one of the electric motors 56, 56' is actuated to draw in and engage the brake pads 44, 48 with the rotor 42. The direction of the rotor 42 determines which of the motors 56, 56' is actuated. The motor 56, 56' not actuated maintains position of the corresponding threaded rod 54, 54' to maintain position of the brake pads 44, 48 and generate the desired gain in braking force.

Figure 7:
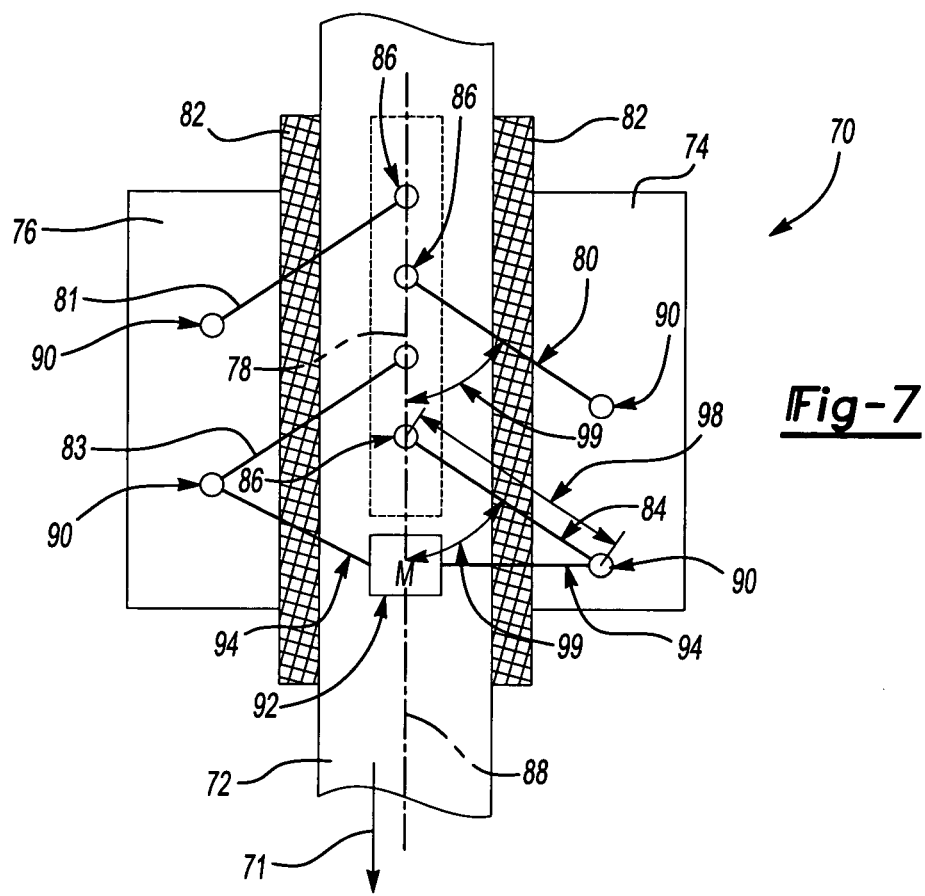
FIG. 7 is a schematic view of another self-energized disk brake assembly.

Referring to FIG. 7, another self-energized brake assembly 70 designed according to this invention includes first and second parallel pivot arms 80, 84. The pivot arms 80, 84 are pivotally attached at a first segment 86 to a caliper housing 78 and at a second segment 90 to first brake pad 74. A second brake pad 76 also includes first and second pivot arms 81, 83 pivotally attached at one segment to the housing 78 and at another segment to the brake pad 76. Each brake pad 74, 76 includes friction material 82 which contacts a rotor 72. The complimentary brake pads 74, 76 are preferably symmetrical about a rotor centerline.

An actuator 92 includes actuation arms 94 attached to drive the brake pads 74,76 between an applied and released position. Each pivot arm 80,81,83 and 84 includes a first pivotal connection 86 disposed on the support 78 and a second pivotal connection 90 disposed on the brake pads 74,76. The first pivotal connection 86 is disposed on a plane defined by a centerline 88 of the rotor 72.

Engaging the rotor 72 with the brake pads 74, 76 increases braking force above that exerted by the actuator 92 by pulling the brake pads 74, 76 in the direction of rotation of the rotor 72. As the brake pads 74, 76 move in the direction of rotation of the rotor 72, a distance between each of the brake pads 74, 76 decreases because the pivot arms 80,81,83 and 84 are of fixed length 98 that translates movement in the direction of rotation into movement toward the rotor 72.

Engagement between the brake pads 74 and 76 creates a friction force pulling the brake pads 74, 76 in the direction indicated by arrow 71. Each of the pivot arms 80, 81, 83 and 84 are of a common length 98. The pivot arms 80,81,83 and 84 are disposed parallel to each other and are attached along the centerline 88 of the rotor 72 to produce forces that pull the pads 74 and 76 inward toward the rotor 72. An angle 99 at which the pivot arms 80,81, 83 and 84 are disposed when the brake pads 74, 76 engage the rotor 72 controls the increase in braking force due to self-energization. The smaller the angle the greater the increase in braking force.

The actuator 92 drives the actuation arms 94 to move the brake pads 74, 76 into initial engagement with the rotor 72. The actuator 92 is preferably a linear motor, however, a worker skilled in the art with the benefit of the teachings of this disclosure will understand that other known actuators are within the contemplation of this invention. Increasing the angle 99 at which the brake pads engage the rotor 72 compensates for wear of the friction material 82. The common length of pivot arms 80, 81, 83, and 84 on either side of the rotor 72 exert a symmetrical braking force on the rotor 72. The symmetrical braking force on the rotor 72 allows for the use of a fixed caliper housing 78.

Figure 8:
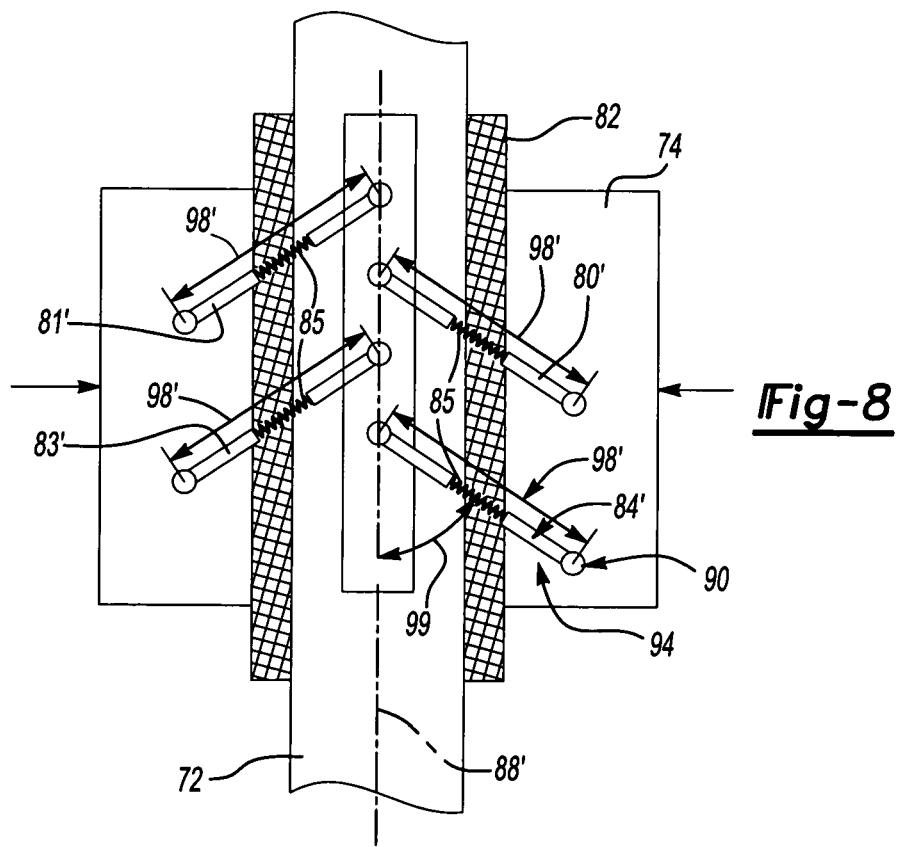
FIG. 8 is a schematic view of another self-energized disk brake assembly.

Referring to FIG. 8, another embodiment of the brake assembly includes pivot arms 80', 81', 83' and 84' that have an adjustable length 98'. Each of the pivot arms 80', 81', 83' and 84' includes an adjustable member 85. The adjustable member 85 is preferably a spring that provide for changes in the length 98' of each pivot arm 80', 81', 83' and 84'. The changes in length 98' provide additional braking force gain by allowing for further decreases in angle 99. The decrease in the angle 99 corresponds with increased gains in the braking forces exerted on the rotor 72.

In operation, the pivot arms 80', 81', 83' and 84' rotate into contact with the rotor 72 at an angle 99. The angle 99 corresponds to the gain in braking force resulting from self-energization. The adjustable member 85 allows an increase in length 98' of each pivot arm 80', 81', 83' and 84' that allows a further decrease in angle 99, which in turn corresponds to a further increase in braking force. The expandable length 99 allows for the use of shorter pivot arms 80', 81', 83' and 84' while obtaining gains that would only otherwise be available with fixed pivot arms of lesser length.

Figure 9:
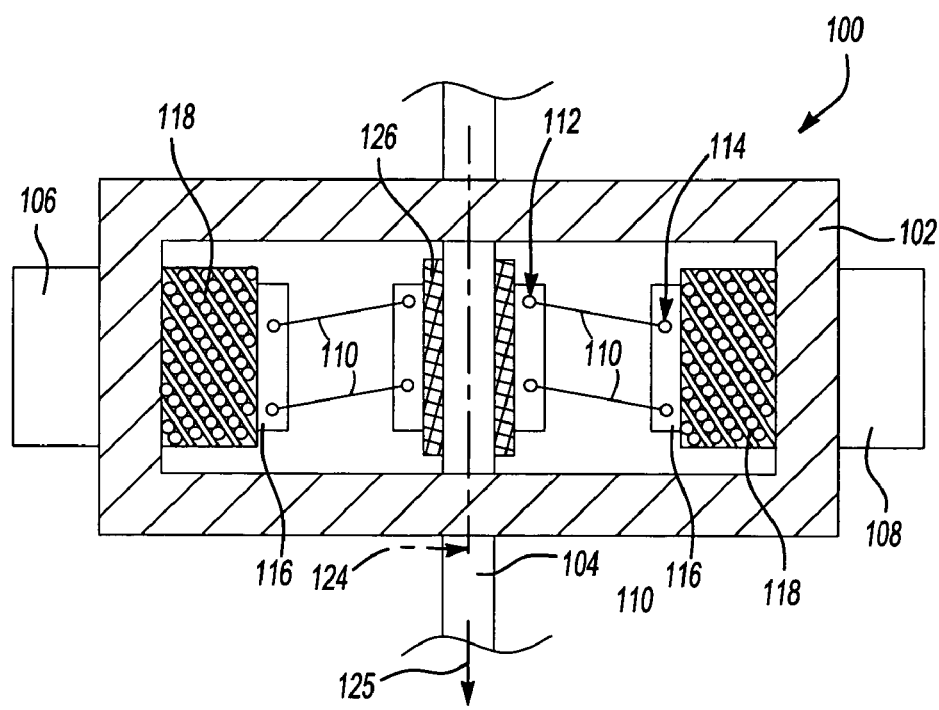
FIG. 9 is a schematic view of another self-energized disk brake assembly.

Referring to FIG. 9, another a self-energized brake assembly 100 includes pivot arms 110 attached at one segment to a caliper housing 126 and at a second segment to a brake pad 116. Each of the pivot arms 110 have a common length forming a parallelogram with each brake pad 116. First and second motors 106, 108 drive ball screws 118 toward and away from a rotor 104. The motors 108, 106 are attached to an outer caliper housing 102 and arc actuatable to bring each of the brake pads 116 into engagement with the rotor 104.

The brake pads 116 contact the rotor 104 and are pulled in the direction of rotor rotation 125. The pivot arms 110 translate movement of the brake pads 116 in the direction of rotation 125 into movement of the brake pads 116 toward the rotor 104 to increase braking forces independent of force exerted by the motors 106, 108.

The pivot arms 110 are attached at a first pivot 112 supported on the caliper housing 126. The first pivot 112 is spaced from a centerline 124 of the rotor 104. Individual motor actuation applies force to each of the brake pads 116 to provide the desired self-energization gains. The use of individual motors 106, 108 provides for the variation in the applied force exerted on each brake pad 116 to accommodate and adjust for differing amounts of wear. Further, the use of two individually actuated motors 106, 108 provides for a fixed outer caliper housing 102.

Figure 10:
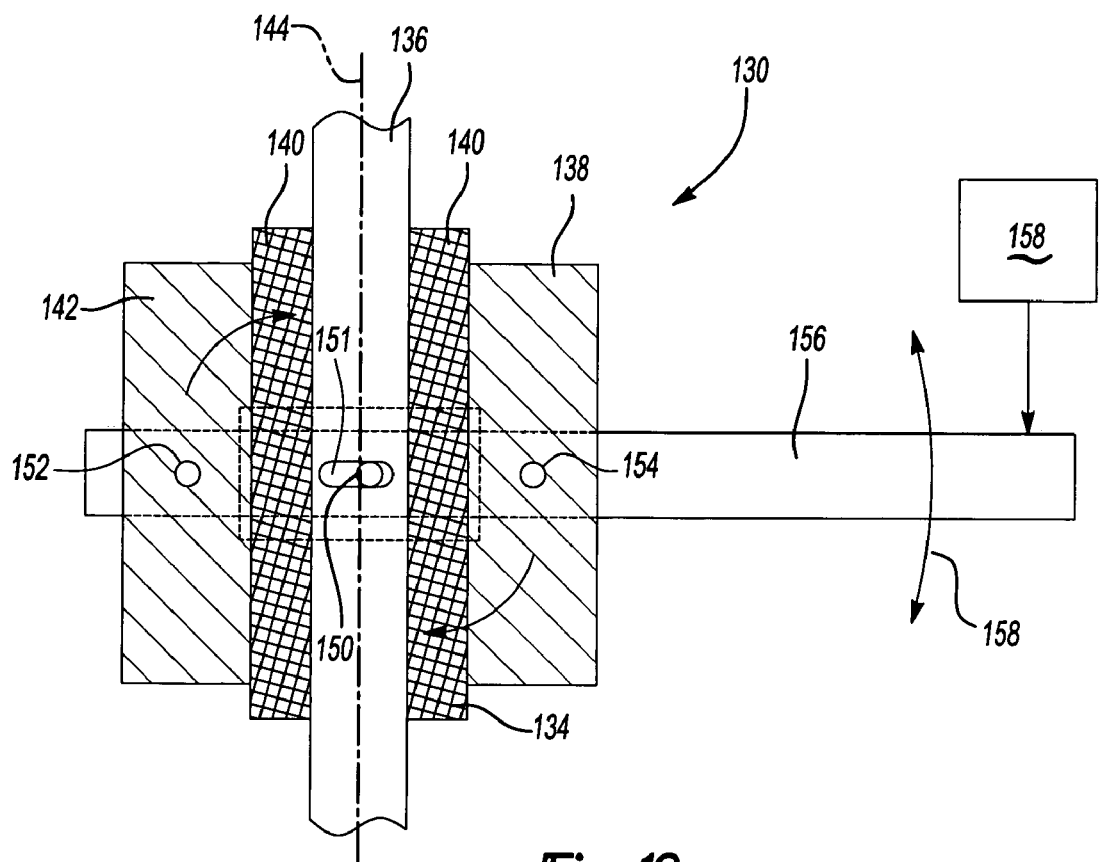
FIG. 10 is a schematic view of another self-energized disk brake assembly.

Referring to FIG. 10, another self-energizing brake assembly 130 includes a single link 156 pivotally attached to first and second brake pads 138, 142. Each brake pad 138, 142 includes friction material 140 comprising a surface engaging a rotor 136. The link 156 is pivotally attached at a pivot 150 disposed on a caliper housing 134. Pivots 154 and 152 attach the link 156 to the first and second brake pads 142, 138. The pivot 150 is disposed within a slot 151 and is movable across the centerline 144 of the rotor 136. As the pivot 150 moves toward the centerline 144 of the brake rotor 136, the force tending to pull one brake pad into the rotor 136 is balanced against the force tending to push the brake pad away from the rotor 136. The further away from the centerline 144 the pivot 150 is moved; the greater the gain in breaking force.

Rotation of the link 156, shown by arrows 158 move the brake pads 138,142 between an applied and release position with the rotor 136. Friction between the brake pads 138, 142 and rotor 136 create the wedging action that drives the brake pads 138,142 into the rotor 136. Spacing between the pivots 150, 154, and 156 provides an additional adjustment to affect the amount of self-energizing force applied to increase braking force.

An actuator 158 rotates the lever 156 and thereby the brake pads 138, 142 into engagement with the rotor 136. The friction force in the direction of rotation of the rotor 136 causes further rotation of the brake pads toward the rotor 136, causing an increase and multiplication of applied braking force. The lever 156 is moved toward a center position to rotate the brake pads 138, 140 away from the rotor 136 to disengage and release the rotor 136. Further, the actuator 158 rotates the lever 156 in either direction to accommodate braking with the rotor 140 rotating in an opposite direction. Increases in braking force are only provided by creating a force to pull the brake pads 138, 142 into the rotor 136. The actuator 158 rotates the lever 156 in a direction causing frictional engagement between the brake pads 138 and the rotor 136. A further increase in braking force is provided by self-energization caused by forcing the brake pads 138, 142 into further contact with the rotor 136.

Figure 11:
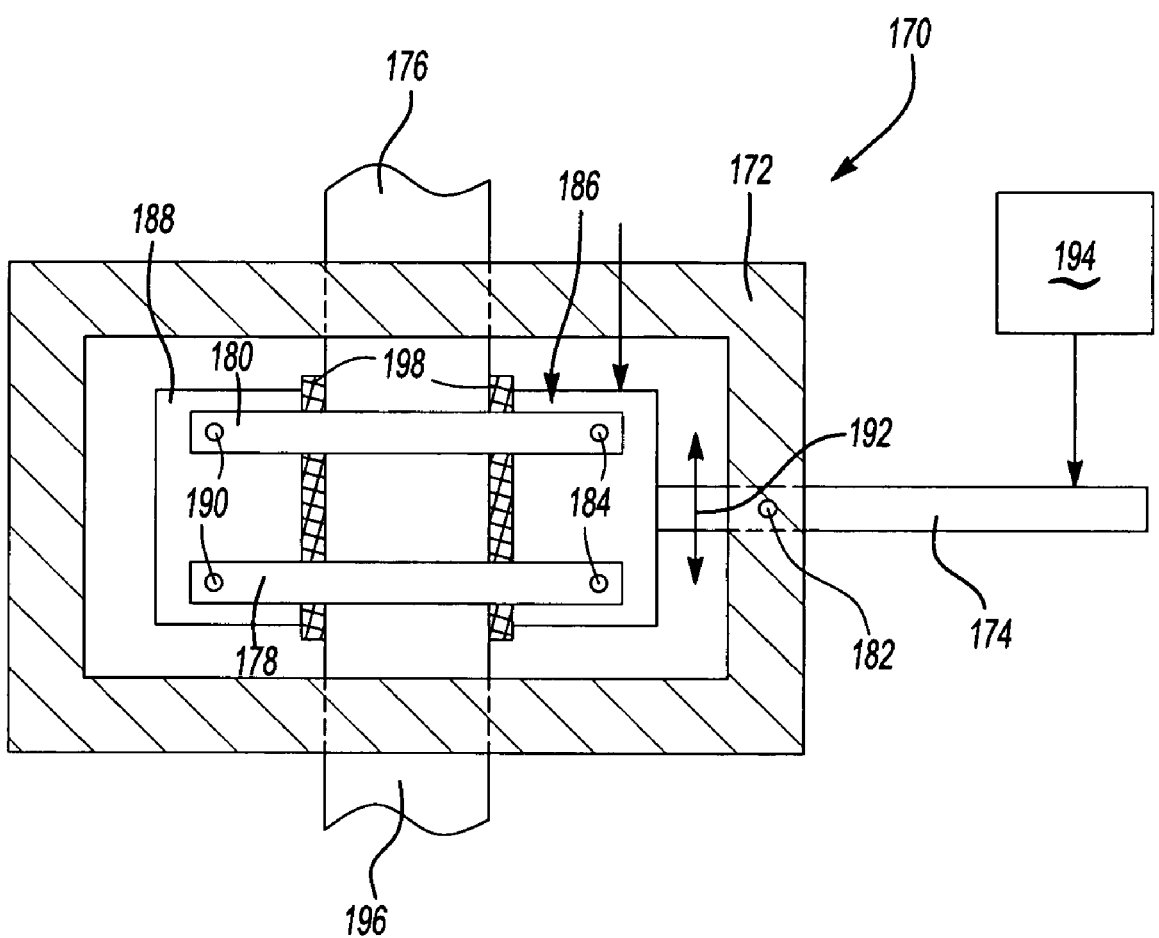
FIG. 11 is a schematic view of another self-energized disk brake assembly.

Referring to FIG. 11, another self-energized brake actuator 170 includes a first brake pad 188 fixed to a sliding caliper 172. A second brake pad 186 is pivotally attached to the first brake pad 188 by first and second pivot arms 178, 180. The pivot arms 178, 180 are pivotally attached to the first brake pad 188 at pivots 190 and to the second brake pad 186 at a pivot 184. The second brake pad 186 rotates in the direction 192 in response to actuation of the lever 174. An actuator 194 applies a force to the lever 174 to move the brake pads 188, 186 into contact with the rotor 176. The actuator 194 is preferably a linear electric motor, however any actuator known to a worker skilled in the art is within the contemplation of this invention.

Friction material 198 on each of the brake pads 188,186 forms the contact surface with the rotor 176. Rotation of the lever 174 by the actuator 194 causes engagement of the second brake pad 186 with the rotor 176. The sliding motion of the second brake pad 186 shortens the distance between brake pads 188,186 causing contact with the rotor 176. Engagement of the rotor 176 causes sliding of the second brake pad 186 and a further decrease in distance between first and second brake pads 188, 186. The brake pads 188,186 rotate into contact with the rotor 176 with an increasing amount of force. The increased force originates from the forces of the rotating rotor 176.

The brake actuators designed according to this invention control gains in braking forces obtained through self-generation and reduce the magnitude of force required to be applied by a brake actuator. Reducing the amount of applied force required provides for the use of electric actuators of smaller sizes and power requirements to overcome weight and power restrictions that would otherwise make electric brake actuation unfeasible.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A self energized brake assembly comprising:
    a rotatable brake member rotatable within a plane of rotation;
    a first arm pivotally attached about a first pivot axis, said first arm engageable to said rotatable brake member on an opposite side of said plane of rotation from said first pivot axis;
    a second arm pivotally attached about a second pivot axis, said second arm engageable to said rotatable brake member on an opposite side of said plane of rotation from said second pivot axis, and said second pivot axis is spaced a distance from said first pivot axis; and
    an adjustable member to control gain in braking force from self-energization by adjusting said distance between said first and second pivot axes.

2. The assembly as recited in claim 1, comprising a biasing member disposed between said first arm and said second arm to bias said first pivot axis and said second pivot axis toward each other.

3. The assembly as recited in claim 1, wherein said adjustable member is a spring disposed to bias said first pivot axis and said second pivot axis towards each other.

4. The assembly as recited in claim 1, comprising an electric drive for adjusting said distance between said first pivot axis and said second pivot axis.

5. The assembly as recited in claim 1, wherein said first pivot axis and said second pivot axis are disposed on a common plane and movable along said common plane to adjust braking force applied to said rotatable brake member.

6. A method of controlling braking force gain created by a self-energizing brake assembly comprising the steps of:
    a.) supporting a first brake pad about a first pivot axis and a second brake pad about a second pivot axis, wherein said first brake pad is selectively engageable to a rotatable brake member on a side of the rotatable brake member opposite said first pivot axis, and said second brake pad is selectively engageable to said rotatable brake member on a side of the rotatable brake member opposite said second pivot axis; and
    b.) adjusting a distance between the first pivot axis and said second pivot axis to control a magnitude of braking force generated by self-energization.

7. The method as recited in claim 6, comprising increasing the distance between the first pivot axis and the second pivot axis to decrease the magnitude of braking force generated by self-energization.

8. The method as recited in claim 6, wherein said step a.) comprises supporting said first brake pad on a support about a first pivot axis and said second brake pad on said support about a second pivot axis within a common plane.

* * * * *